United States Patent [19]

Vogt

[11] Patent Number: 5,740,992
[45] Date of Patent: Apr. 21, 1998

[54] APPARATUS FOR CONTINUOUSLY MEASURING THE POSITION OF A MOVING RAIL VEHICLE

[75] Inventor: Ulrich P. Vogt, Essen, Germany

[73] Assignee: Krupp Fordertechnik GmbH, Essen, Germany

[21] Appl. No.: 798,622

[22] Filed: Feb. 11, 1997

[30] Foreign Application Priority Data

Mar. 8, 1996 [DE] Germany .................. 196 09 036.9

[51] Int. Cl.[6] .................................................. B61L 25/02
[52] U.S. Cl. ................... 246/122 R; 246/201; 246/204; 246/246
[58] Field of Search .................. 246/122 R, 201, 246/203 R, 203 C, 203 D, 204, 206, 246

[56] References Cited

U.S. PATENT DOCUMENTS

| | | | |
|---|---|---|---|
| 1,235,880 | 8/1917 | Culton | 246/204 |
| 1,703,055 | 2/1929 | Bourg | 246/204 |
| 4,076,192 | 2/1978 | Hoge | 246/247 |
| 4,630,792 | 12/1986 | Frielinghaus | 246/204 |
| 5,169,064 | 12/1992 | Rice . | |
| 5,601,259 | 2/1997 | DiChiara | 246/203 C |
| 5,621,195 | 4/1997 | Taylor et al. | 246/247 |

FOREIGN PATENT DOCUMENTS

| | | |
|---|---|---|
| 937 242 | 12/1946 | France . |
| 42 32 171 A1 | 3/1994 | Germany . |
| 43 30 302 A1 | 3/1994 | Germany . |
| 42 33 007 | 4/1994 | Germany . |
| 42 13 810 | 5/1995 | Germany . |
| 295 07 967 | 9/1995 | Germany . |
| 06239585 | 8/1994 | Japan . |

Primary Examiner—S. Joseph Morano
Attorney, Agent, or Firm—Herbert Dubno

[57] ABSTRACT

A measuring stretch along a railway track of a transloading system has an array of switches with respective sensors positioned for engagement by a wheel of a railway carriage. The lateral displacement of the railway carriage wheel is prevented by a guide disposed along the rail at the level of the head at a distance of 30 to 50 mm from the head of the rail. The row of switches can be provided on the opposite side of this rail. The switches synchronize a transloader with the rail vehicle via a computer to which the switches are operatively connected.

18 Claims, 3 Drawing Sheets

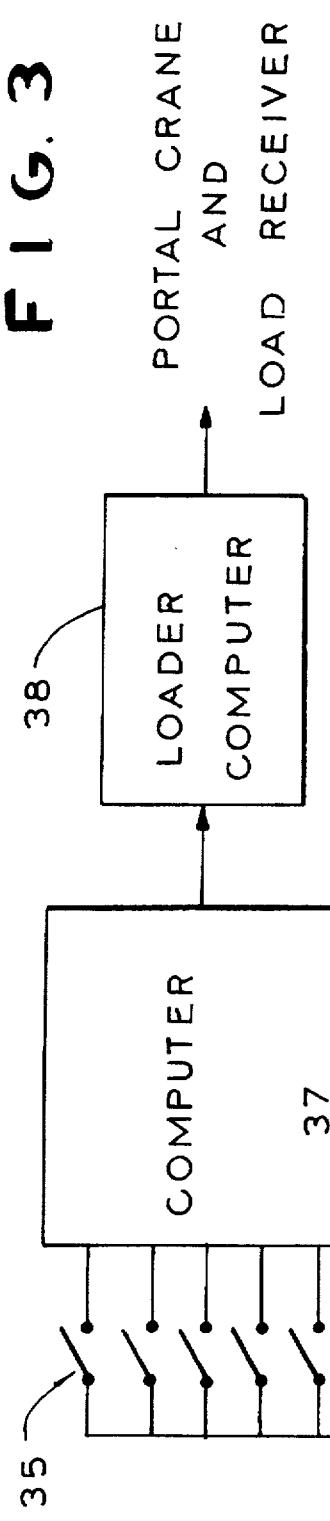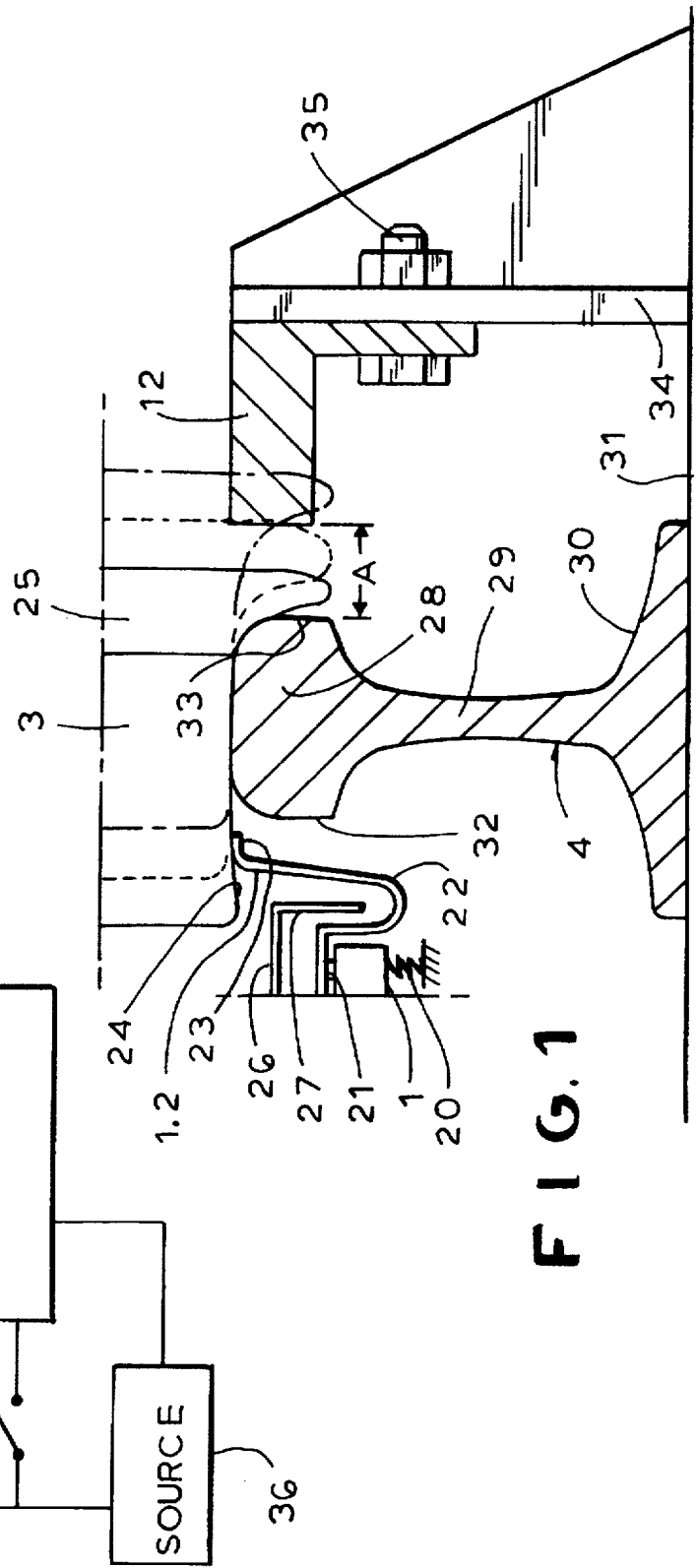

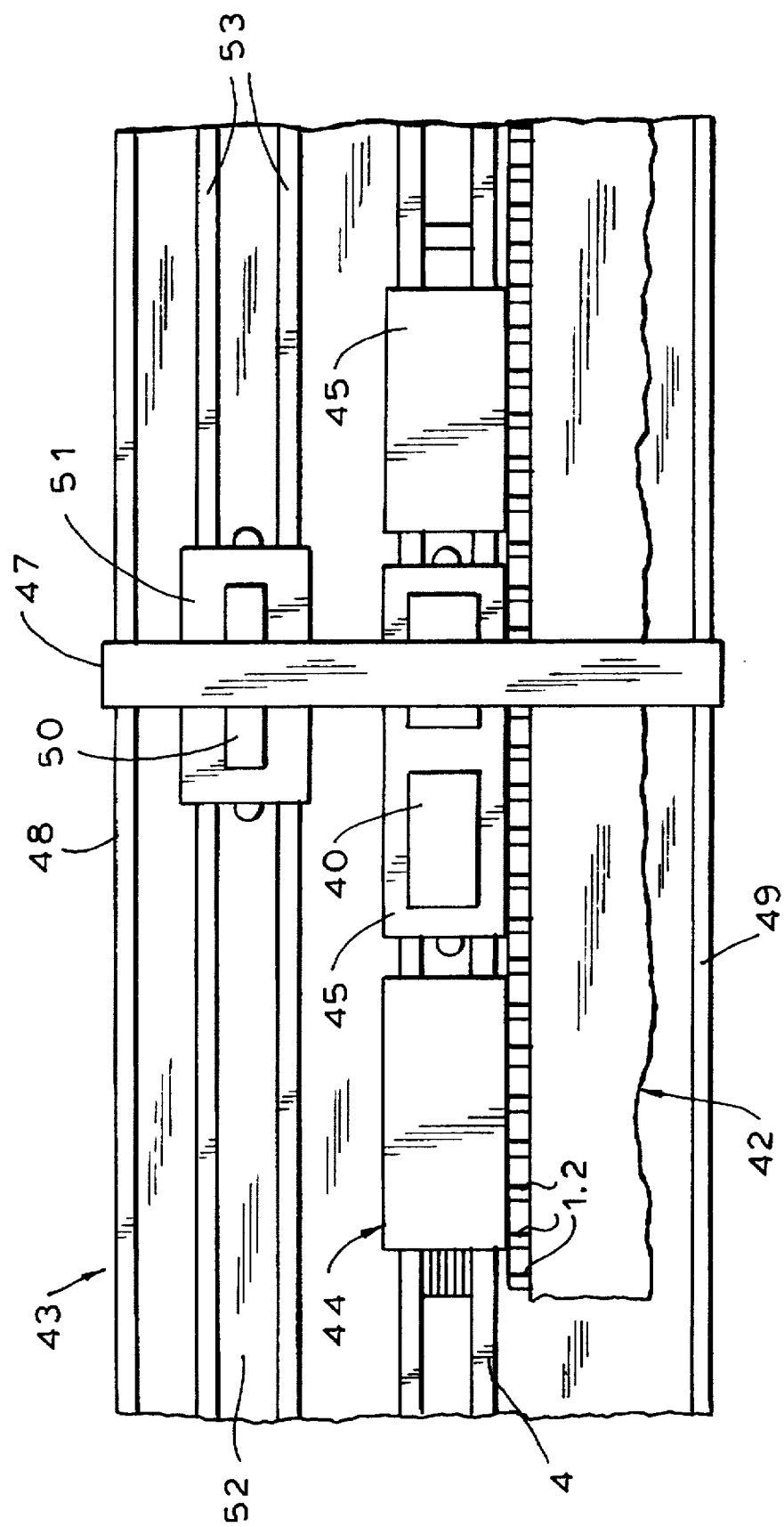

5,740,992

1

APPARATUS FOR CONTINUOUSLY MEASURING THE POSITION OF A MOVING RAIL VEHICLE

FIELD OF THE INVENTION

My present invention relates to an apparatus or device for continuously measuring the instantaneous position of a rail vehicle traveling along a railway track having a pair of parallel rails and a measuring stretch parallel to the track along which measurement of the position of the vehicle is to occur. In particular, the invention relates to a measurement stretch which can provide an input for a computer which can be used to control a load transfer system, i.e. the drive for a transloader or the like for transferring loads from the railway vehicle to an off-loading vehicle or station or for transferring loads from a station alongside the track to a rail vehicle on the track.

BACKGROUND OF THE INVENTION

In transloading systems, load units like containers, replacement containers, trailers, semitrailers or the like, are exchanged between rail vehicles and a storage station or another vehicle alongside the track utilizing a transloader, e.g. a portal crane, which is also displaced along the track and thus must be synchronized with the rail vehicle or positioned in accordance with the position of the traveling rail vehicle.

It is thus important to determine the instantaneous position of the rail vehicle so as to coordinate the movement of the transloader with the movement of the rail vehicle. In loading or transferring a load unit onto the load vehicle such synchronization is important so that the load unit is lowered onto the proper position of the railway car whereas for unloading the proper synchronization is required to ensure exact alignment of the transloader with the load unit on the railroad car to enable it to be picked up from the car. For that purpose, precision determination of the position and the speed of the railway vehicle is necessary.

For such determination in the past, measuring carriages have been used, e.g. as described in DE 42 33 007 A1. Systems of that type are very costly and complex. There is also a problem with reliability and breakdown.

OBJECTS OF THE INVENTION

It is the principal object of the present invention to provide an improved device for continuously measuring the instantaneous position of a rail vehicle traveling along a measurement stretch and which is capable of reliably supplying a measurement result, i.e. registering the position of the vehicle, at comparatively low cost.

Another object of the invention is to provide a system for the purposes described which is less prone to failure and hence is more reliable than prior art systems.

Another object of this invention is to provide a improved transloading system in which the determination of the position of a traveling rail vehicle is facilitated.

SUMMARY OF THE INVENTION

These objects and others which will become apparent hereinafter are attained in accordance with the invention by providing along the measurement stretch over the length thereof, spaced apart or distributed switching elements which are provided with mechanical sensors responsive to engagement by the vehicle and thus disposed in the region

2 of a rail of a railroad track, for example so that the sensors are successively engaged by a wheel of the rail vehicle.

In addition, proximal to one of the rails on the flange side thereof, i.e. on the side at which the wheels of the vehicle have their respective flanges, a guide is provided over the total length of the measurement stretch and whose distance from the head of the rail amounts to 30 to 50 mm.

With this system, the position of a wheel of the vehicle is detected by the measurement sensors and the respective switch elements are actuated to signal the position of the vehicle to a computer which can control the transloader in the sense described previously. The drive for the transloader can be so controlled that the transloader can always be positioned with high accuracy at the correct location with reference to the vehicle and synchronously moved therewith.

The guide rail or bar alongside the head of one of the rails on the flange side thereof also ensures that the wheel which engages the sensors will always track along an ideal line relative to the sensors and hence even during a tendency toward sinusoidal travel or with wear of the wheel, the sensors will be properly engaged one after the other.

The sensors can be tabs which project into the path of the felly of the wheel and can extend for a sufficient width so that, as long as the wheel flange lies between the head and the guide, the felly will engage the tabs which actuate the switch elements. Thus the position of the vehicle is always reliably determined.

A device according to the invention for measuring the position of a traveling rail vehicle can thus comprise:

a row of switching elements distributed along the stretch and provided with mechanical sensors positioned for engagement by the vehicle for successive operation of the switching elements as the vehicle travels along the stretch of track;

a guide extending over the length of the stretch alongside the one of the rails and at a spacing from the flank of 30 to 50 mm for limiting movement of the vehicle away from the sensors as the vehicle travels along the stretch; and a computer operatively connected with the switching elements for signaling the position of the vehicle along the track.

A transloading system according to the invention can comprise:

a track formed with a pair of rails extending through a transloading region;

a railway vehicle traveling along the track and displaceable along a stretch of the track along which a position of the vehicle is to be measured, the vehicle being capable of receiving a load to be transferred from the vehicle or transferred to the vehicle, the vehicle having wheels each formed with a felly riding on a respective one of the rails and a flange adjacent the felly and disposed along a flank of the one of the rails;

load-receiving means adjacent the track and adapted to receive a load from or deliver a load to the vehicle;

a transloader at the region bridging the track and the load-receiving means for picking up a load from the vehicle and depositing it upon the loads-receiving means and for picking up a load from the load-receiving means and depositing it upon the vehicle;

a device for continuously measuring a position of the vehicle along the stretch, the device comprising:

a row of switching elements distributed along the stretch and provided with mechanical sensors positioned for engagement by the vehicle for successive operation of the switching elements as the vehicle travels along the stretch of track, and a guide extending over the length of the stretch alongside the one of the rails and at a spacing from the flank of 30 to 50 mm for limiting movement of the vehicle away from the sensors as the vehicle travels along the stretch; and a computer operatively connected with the switching elements for signaling the position of the vehicle along the track and controlling the transloader.

Preferably the switching elements are provided directly proximal to the rail with the switching elements being located adjacent the rail head or above or below the rail head so that damage to the switching elements is excluded. Further protection of the switching elements against damage can be provided by a sheet metal covering which lies above the array of switch elements.

According to a further feature of the invention, the sensors which are engaged by one of the wheels of the vehicle are switching tabs of a mechanically actuatable array of switches, thereby enabling the use of commercially available components.

It has been found to be advantageous to spring mount the switch elements for the switching tabs or to make them resilient in themselves. The spring mounting can be effected by metal springs, rubber springs or the like or by means of pneumatic or hydraulic units. Each switch element or its respective switch tab can be individually mounted or groups of switch elements or groups of switch tabs can be assembled together and spring mounted together.

In a preferred embodiment of the invention, the spacing of the guide from the head of the rail is 35 to 40 mm. This enables the use of small and thus inexpensive switch elements with relatively small actuation displacements. Preferably the guide is disposed alongside the same rail as is provided with the array of switch elements but on the opposite side thereof.

To facilitate transport and mounting of the guide rail, it may be composed of a plurality of aligned guide rail segments which, because of their reduced weight can be more easily handled than a guide rail extending the full length of the stretch.

BRIEF DESCRIPTION OF THE DRAWINGS

The above and other objects, features, and advantages will become more readily apparent from the following description, reference being made to the accompanying drawing in which:

FIG. 1 is a cross sectional view in highly diagrammatic form illustrating the apparatus or device of the present invention;

FIG. 3 is block diagram of the circuitry involved; and

FIG. 4 is a plan view diagrammatically showing a transloading station in accordance with this invention.

SPECIFIC DESCRIPTION

Figure 2:
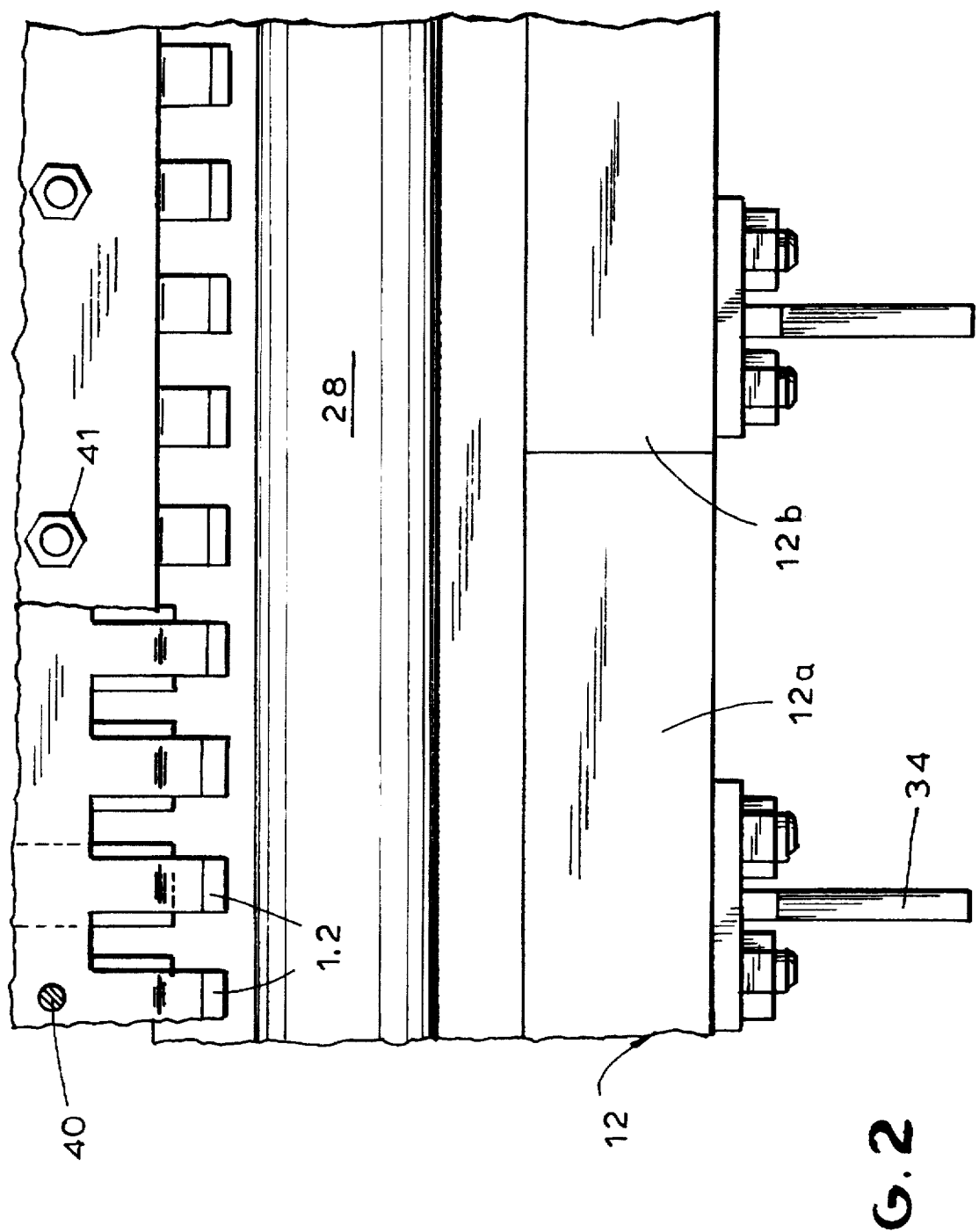
FIG. 2 is a diagrammatic plan view of a portion of a railway track provided with the measuring stretch according to the invention.

As can be seen from FIG. 1, an array of switching elements which may be spring-mounted as represented at 20 can have their respective actuating tabs or sensors 1.2 spring-loaded via the actuating formation 21 of the switch which may be spring-biased upwardly by the conventional spring within the mechanical switch. The tabs 1.2 are themselves resilient by virtue of a bend 22 therein and a bent finger 23 which is engaged by the felly 24 of a railroad wheel 3 whose flange is represented at 25 in FIG. 4. A cover sheet metal element 26 overlies switches 1 and has a downwardly turned formation 27 which engages in the bend 22 but does not contact the tab 1.2. The array of switch elements lies below but proximal to the head 28 of a rail 4 whose web 29 extends upwardly from the base 30 which can be mounted on sleepers or the like as represented at 31. The head 28 has a pair of flanks 32 and 33. The tabs 1.2 lie along one side of the head 28 while a guide rail 12 lies along the opposite side at a spacing A from the flank 33. The rail 12 can be subdivided into segments 12a, 12b, etc. in end to end relationship (see FIG. 2), the segments being mounted on spaced apart supports 34 via bolts 35 as is visible in FIG. 2. The switch elements 1 can be simple switches as shown at 35 in FIG. 3 connected between a source 36 of electric current with a computer 37 which operates the transloader controller or drive 38.

Returning to FIG. 2, it can be seen that the tabs 1.2 can be formed as projections from a sheet metal member 39 which is held in place by bolts 40 and nuts 41.

The distance A is preferably 35 to 40 mm but can be as great as 30 to 50 mm.

As can be seen from FIG. 4, a measuring stretch 42 can be provided in transloading system 43 and can have the sensors 1.2 spaced all along this measuring stretch on one side of the rail 4 while on the opposite side of this rail, the guide 12 is mounted. The guide is thus at the flange side of the rail and limits the displacement laterally of the wheel 3 of a train 44 of cars 45 which carry load units 46, the latter being containers, trailers or semitrailers. The transloader in this case is a portal crane 47 which is displaceable along the tracks 48 and 49 by a drive not shown operated by the controller 38, the portal crane carrying a load engaging spreader 50 which can deposit the load unit on another railway vehicle 51, on a truck or on a storage location as represented by the region 52 here, for convenience, being shown as another railway track 53. The operation of the transloader, of course, is clear.

By ascertaining the position and speed of the train 44, the computer 37 synchronizes the transloader 47 therewith to allow transfer of the load units to the train or from the train.

Since the rail 12 allows a shift of the wheel 3 in its sinusoidal travel to the region represented between the solid lines and broken lines in FIG. 1, excluding movement into the dot-dash line position, for example, the wheel 3 always engages the row of sensors 1.2 to operate the switches 1, 35 to thereby signal the position of the train to the computer 37.

I claim:

1. A device for continuously measuring position of a moving railway vehicle along a stretch of track having rails, said vehicle having wheels each formed with a felly riding on a respective one of said rails and a flange adjacent the felly and disposed along a flank of said one of said rails, the device comprising:

a row of switching elements distributed along said stretch and provided with mechanical sensors positioned for engagement by said vehicle for successive operation of said switching elements as said vehicle travels along said stretch of track;

a guide extending over the length of said stretch alongside said one of said rails and at a spacing from said flank of 30 to 50 mm for limiting movement of said vehicle away from said sensors as said vehicle travels along said stretch; and a computer operatively connected with said switching elements for signaling the position of said vehicle along said track.

2. The device defined in claim 1 wherein said mechanical sensors are disposed directly adjacent said one of said rails.

3. The device defined in claim 1 wherein said sensors are positioned for engagement by the felly of one of said wheels riding on said one of said rails.

4. The device defined in claim 1 wherein said switching elements are electrical switches and said sensors are an array of tabs actuating said switches.

5. The device defined in claim 4 wherein said switches are spring biased.

6. The device defined in claim 4 wherein said tabs are spring biased.

7. The device defined in claim 1 wherein said spacing is 35 to 40 mm.

8. The device defined in claim 1 wherein said row is disposed along the same rail as said guide and on the opposite side of the latter rail from said guide.

9. The device defined in claim 1 wherein said guide is comprised of a plurality of aligned elongated guide segments.

10. A transloading system comprising:

a track formed with a pair of rails extending through a transloading region;

a railway vehicle traveling along said track and displaceable along a stretch of said track along which a position of the vehicle is to be measured, said vehicle being capable of receiving a load to be transferred from said vehicle or transferred to said vehicle, said vehicle having wheels each formed with a felly riding on a respective one of said rails and a flange adjacent the felly and disposed along a flank of said one of said rails;

load-receiving means adjacent said track and adapted to receive a load from or deliver a load to said vehicle;

a transloader at said region bridging said track and said load-receiving means for picking up a load from said vehicle and depositing it upon said load-receiving means and for picking up a load from said load-receiving means and depositing it upon said vehicle;

a device for continuously measuring a position of said vehicle along said stretch, said device comprising:

a row of switching elements distributed along said stretch and provided with mechanical sensors positioned for engagement by said vehicle for successive operation of said switching elements as said vehicle travels along said stretch of track, and a guide extending over the length of said stretch alongside said one of said rails and at a spacing from said flank of 30 to 50 mm for limiting movement of said vehicle away from said sensors as said vehicle travels along said stretch; and a computer operatively connected with said switching elements for signaling the position of said vehicle along said track and controlling said transloader.

11. The transloading system defined in claim 10 wherein said mechanical sensors are disposed directly adjacent one of said rails.

12. The transloading system defined in claim 10 wherein said sensors are positioned for engagement by the felly of one of said wheels riding on one of said rails.

13. The transloading system defined in claim 10 wherein said switching elements are electrical switches and said sensors are an array of tabs actuating said switches.

14. The transloading system defined in claim 13 wherein said switches are spring biased.

15. The transloading system defined in claim 13 wherein said tabs are spring biased.

16. The transloading system defined in claim 10 wherein said spacing is 35 to 40 mm.

17. The transloading system defined in claim 10 wherein said row is disposed along the same rail as said guide and on the opposite side of the latter rail from said guide.

18. The transloading system defined in claim 17 wherein said guide is comprised of a plurality of aligned elongated guide segments.

* * * * *